March 31, 1964     H. N. MASON ETAL     3,126,933

TRAVELLER'S CANINE CANTEEN

Filed Sept. 18, 1961

INVENTORS
HOLLIS N. MASON
THOMAS J. LUNSFORD
BY
Knox & Knox

United States Patent Office 3,126,933
Patented Mar. 31, 1964

3,126,933
TRAVELLER'S CANINE CANTEEN
Hollis N. Mason, 3630 Louisiana St., and Thomas J. Lunsford, 2908 Canon St., both of San Diego, Calif.
Filed Sept. 18, 1961, Ser. No. 138,732
2 Claims. (Cl. 150—48)

This invention relates to a canteen for animals, and more particularly to a portable and collapsible moisture proof, self-contained feeding bowl for both cats and dogs.

Background

It is well known that providing food and water for an animal while travelling poses a real problem. The problem is even more acute with the seeing-eye type of dog used for guidance of blind people in a city.

It is possible to carry, or obtain, canned or packaged food, and to obtain water at gas stations and stores, but there is no simple way of carrying a bowl large enough to permit the animal to eat or drink therefrom.

Objects and Drawings

It is therefore the principal object of our invention to provide novel food and drink providing means for an animal.

It is another object of our invention to provide a collapsible animal-feeding means.

It is a further object of our invention to provide a portable and collapsible vessel for containing food and/or water for an animal.

The attainment of these objects and others will be realized from the following specification, taken in conjunction with the drawings, in which.

Brief Description of the Invention

Broadly stated, our invention comprises a container of flexible, preferably waterproof material, such as plastic, that opens to form a shallow vessel having a substantially flat bottom and substantially vertical sides.

The upper edge of the vessel is attached to, or contains, a deformable rim that can be folded to a convenient size, or opened to a size that will permit the animal to drink or feed from the vessel.

To provide improved portability, our vessel incorporates a flap that wraps around the collapsed vessel, and fastens in a closed manner to assume a minimal size.

Detailed Description of the Invention

Figure 1:
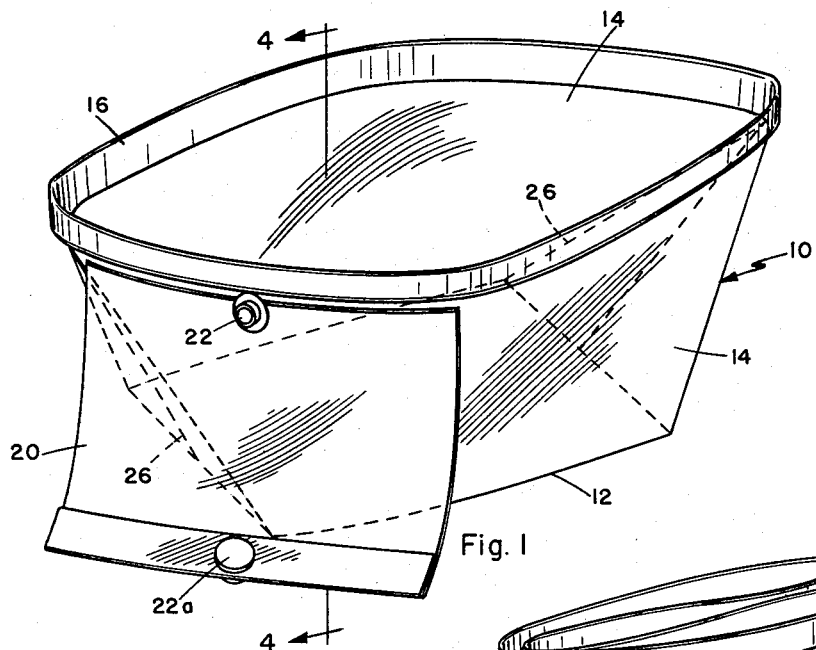
FIGURE 1 is a perspective view of our invention as used in its open form.

The manner of use of our invention will be obvious from FIGURE 1 wherein our canteen 10 is shown opened for a dog. As may be seen, this is a shallow vessel of a flexible, waterproof material such as plastic, rubber, waterproofed fabric, or the like. Vessel 10 is formed of a configuration to be later described, so that it has a substantially flat bottom 12, and substantially vertical self-supporting walls 14.

The upper edge 16 is hemmed, and encloses a deformable stiffener 18, such as resilient plastic, plastic covered wire, or the like. We have found that television antenna or lead-in wire of the type known as "twin-lead" is particularly satisfactory for several reasons. It is readily available at reasonable cost; it's readily deformable; when so deformed it retains its given configuration; its dimension is such as to form a suitable rim; it has smooth surfaces that do not endanger the plastic walls; and the plastic portion thereof may be bonded to itself and to the plastic walls, if desired.

As shown in FIGURE 1, the vessel 10 is opened and erected, the dimensions being such as to contain enough food or water for a complete feeding. The upper edge of vessel 10 forms a rim that is large enough to permit the animal to insert his face, and to reach the food or water; while the flat bottom of vessel 10 ensures stability against tipping over.

Vessel 10 has a wrapping flap 20, whose width is approximately one-quarter the circumference of edge 16, one end of flap 20 being secured to the vessel. The function of this flap will be described later.

When the animal has finished his meal, vessel 10 may be washed or shaken out, thus removing any remaining particles or droplets from its smooth inner surface.

Figure 2:
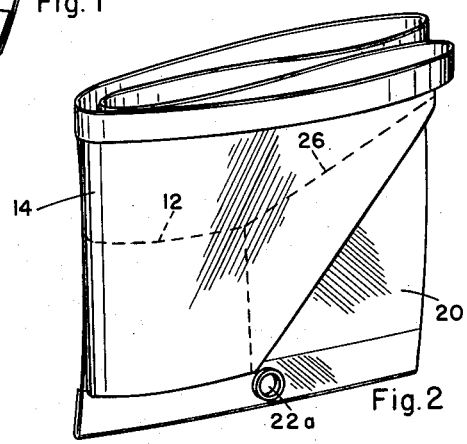
FIGURE 2 is a perspective view of our invention in a partially collapsed form.

To collapse the vessel, the opposing sides of the upper edge are brought adjacent each other, and the bottom 12 is folded upwardly between sides 14. The entire vessel is now folded in half, as shown in FIGURE 2, and the wrinkles smoothed out, if desired.

Figure 3:
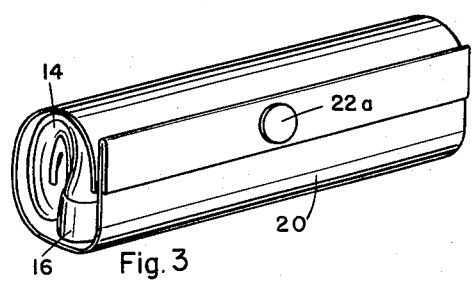
FIGURE 3 is a perspective view of our invention in its collapsed and wrapped form.

The flattened vessel is then rolled up tightly on itself until it forms a compact cylinder adjacent the upper edge, whereupon flap 20 is wrapped around the cylinder to prevent it from unrolling, as shown in FIGURE 3.

One end of flap 20 may be fastened to the other end in any convenient way. We have found that a snap-type fastening 22 is very convenient. The fastening of the flap can be improved if its free end is also hemmed and encloses a length of stiffener 18. This stiffener provides additional strength, as one part 22a of the snap can be attached thereto. In this way the pressure of opening and closing the snap is taken by the wire rather than the plastic wall, thus assuring a longer useful life for the canteen.

Figure 4:
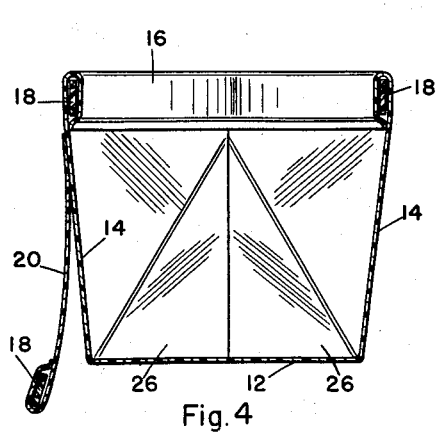
FIGURE 4 is a sectional view taken along the line 4—4 of FIGURE 1.

A cross section of the vessel is shown in FIGURE 4. Here the hems of the flap 20 and the upper edge 16 are shown enclosing stiffeners 18. Flap 20 is illustrated as being bonded to the wall, and having portion 22 of the snap mounted thru the flap and wall for strength, and having the other portion 22a of the snap mounted at the hem edge of the flap, and thru stiffener 18.

Figure 5:
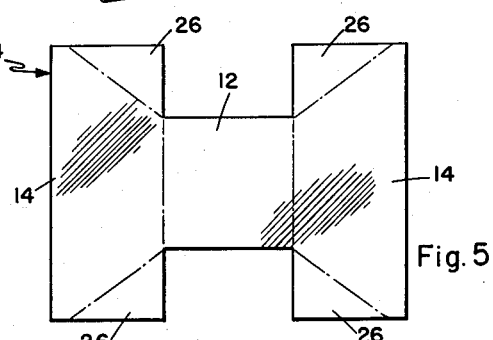
FIGURE 5 illustrates the flat pattern of the material which forms the vessel.

We have found that a vessel having a flat bottom and vertical walls can be made from a section of H shaped material 24 as shown in FIGURE 5. It is folded along the broken lines, and sealed together along the appropriate edges by heat, adhesive, or other suitable means. The projecting arm portions of the H-shaped material are secured together at their end edges, the inner edges being sealed to the end of bottom portion 12. When completed, the end walls 26 thus formed are triangular with central seams and readily fold inwardly when the vessel is collapsed.

While a vessel having a flat bottom and vertical sides has advantages, a different type vessel may at time be desired; and this may be produced from a differently shaped piece of material, or from several pieces of material that are suitably joined.

Advantages

It is evident that our invention will be a great boon to those whose pet or animal travels along with them. It assures that the animal can be properly fed on the trip from a clean container. It also assures a container that may be used almost anywhere, since it is stable against tipping over, and will not easily dump its contents of food or water on the floor. On canteen is small, compact, and lightweight and constructed to fit into a pocket or purse, and so may be available at all times. And finally, after use it is clean enough to be placed in a pocket or purse.

It is understood that minor variation from the form of the invention disclosed herein may be made without departure from the spirit and scope of the invention, and that the specification and drawing are to be considered as merely illustrative rather than limiting.

We claim:

1. A collapsible, portable vessel for feeding an animal, comprising:

a piece of flexible waterproof material folded and sealed to produce a vessel having a substantially flat bottom and substantially vertical self-supporting sides, the upper edge of said vessel being hemmed and enclosing a length of material that is manually deformable and capable of holding shape into which it is formed, whereby when said upper edge is opened it provides an opening large enough to permit an animal to insert its face into said vessel and obtain the food placed therein, and when said upper edge is folded, the flexible material forming said vessel may be rolled into a compact cylinder; and a wrapping flap having a width substantially equal to one-quarter the circumference of said edge of said vessel and having a length substantially equal to the circumference of said compact cylinder, said flap having one end thereof secured to said vessel adjacent the upper edge thereof, said flap further having one portion of a snap-type fastener mounted thru said flap adjacent the upper edge of said vessel, said flap having a complementary portion of a snap-type fastener mounted thru its other end, whereby said wrapping flap may enclose said vessel when rolled into said cylindrical form, and may be retained in said wrapped relation by means of the engaged snap fastener.

2. A collapsible, portable vessel for feeding an animal, comprising:

a substantially H shaped piece of flexible waterproof material folded and sealed to produce a vessel having a substantially flat bottom and substantially vertical self-supporting sides, the upper edge of said vessel being hemmed and enclosing a stiffener of resilient material that is capable of holding the shape into which it is manually formed, whereby when said upper edge and stiffener are opened it provides a circular opening large enough to permit an animal to insert its muzzle into said vessel and obtain the food placed therein, and when said upper edge and stiffener is folded, the flexible material forming said vessel may be rolled into a compact cylinder; and a wrapping flap having a width substantially equal to one-quarter the circumference of said edge of said vessel and having a length substantially equal to the circumference of said compact cylinder, said flap havinv one end thereof secured to said vessel adjacent the upper edge thereof, said flap further having one portion of a snap-type fastener mounted thru said flap and wall adjacent the upper edge of said vessel, said flap having its other end hemmed and enclosing a stiffener and having a complementary portion of a snap-type fastener mounted thru said hem and enclosed stiffener, whereby said wrapping flap may enclose said vessel when rolled into said cylindrical form, and may be retained in said wrapped relation by means of the engaged snap fastener to permit placing said collapsed vessel in a pocket.

References Cited in the file of this patent

UNITED STATES PATENTS

| | | |
|---|---|---|
| 783,811 | Allen | Feb. 28, 1905 |
| 1,476,991 | McMath | Dec. 11, 1923 |